United States Patent [19]

Smalley et al.

[11] Patent Number: 5,227,038
[45] Date of Patent: Jul. 13, 1993

[54] ELECTRIC ARC PROCESS FOR MAKING FULLERENES

[75] Inventors: Richard E. Smalley; Robert E. Haufler, both of Houston, Tex.

[73] Assignee: William Marsh Rice University, Houston, Tex.

[21] Appl. No.: 771,741

[22] Filed: Oct. 4, 1991

[51] Int. Cl.$^5$ ............................................. C01B 31/00
[52] U.S. Cl. .................................... 204/173; 423/445
[58] Field of Search ................... 423/446, 445, 445 B, 423/460; 156/DIG. 68; 204/172, 173

[56] References Cited

U.S. PATENT DOCUMENTS

| | | | |
|---|---|---|---|
| 3,317,354 | 5/1967 | Darrow et al. | 156/DIG. 68 |
| 4,767,608 | 8/1988 | Matsumoto et al. | 156/DIG. 68 |
| 4,915,977 | 4/1990 | Okamoto et al. | 427/37 |

FOREIGN PATENT DOCUMENTS

| | | |
|---|---|---|
| 2160696 | 6/1990 | Japan . |
| 2221194 | 9/1990 | Japan ............................ 156/DIG. 68 |
| 9204279 | 3/1992 | World Int. Prop. O. . |
| 1587000 | 8/1990 | U.S.S.R. . |

OTHER PUBLICATIONS

Kratschmer et al., "Spectroscopy of Matrix Isolated Carbon Cluster Molecules Between 200 and 850 nm Wavelength", *Surface Science* 156 (1986) pp. 814-821.
Kroto et al., "$C_{60}$:Buckminsterfullerene". *Chemical Reviews* 91 (6) (1991) pp. 1213-1235.
"Growth, Structure, and Properties of Graphite Whiskers," Roger Bacon, J. App. Phys., vol. 31, No. 2, pp. 283-290, Feb. 1960.
J. Lefevre, Annales Astrophysiq, "Etude De Poussieres De Fer Et De Carbone," Tome 30, Annee 1967, Fasc. 4, pp. 731-738.
J. Lefevre, "An Experimental Study of the Dust of Iron, Carbon, Silicon Carbide and Silica," Astron. & Astrophys, 5, (1970), pp. 37-44.
K. L. Day, D. R. Huffman, "Measured Extinction Efficiency of Graphite Smoke in the Region 1200-6000 Å," Nature Physical Science, vol. 243, May 21, 1973, pp. 50-51.
H. W. Kroto, J. R. Heath, S. C. O'Brien, R. F. Curl and R. E. Smalley, "$C_{60}$: Buckminsterfullerene," Nature, vol. 318, No. 6042, Nov. 14-20, 1985.
J. R. Heath, S. C. O'Brien, Q. Zhang, Y. Liu, R. F. Curl, H. W. Kroto, F. K. Tittel, and R. E. Smalley, "Lanthanum Complexes of Spheroidal Carbon Shells," Journal of the American Chemical Society, vol. 107, (1985), pp. 7779-7780.
Q. L. Zhang, S. C. O'Brien, J. R. Heath, Y. Liu, R. F. Curl, H. W. Kroto, and R. E. Smalley, "Reactivity of Large Carbon Clusters: Spheroidal Carbon Shells and Their Possible Relevance to the Formation and Morphology of Soot," The Journal of Physical Chemistry, vol. 90, No. 4, (1986), pp. 525-528.
Sumio Iijima, "The 60-Carbon Cluster Has Been Revealed!," The Journal of Physical Chemistry, vol. 91, (1987), pp. 3466-3467.
Ph. Gerhardt, S. P. Loffler and K. H. Homann, "Polyhedral Carbon Ions in Hydrocarbon Flames," Chemical Physics Letters, vol. 137, No. 4, Jun. 19, 1987, pp. 306-310.
D. R. Huffman, "Methods and Difficulties in Laboratory Studies of Cosmic Dust Analogues," *Experiments On Cosmic Dust Analogues*, vol. 149, Sep. 8-12, 1987, pp. 25-41.
R. F. Curl and R. E. Smalley, "Probing $C_{60}$," Science, vol. 242, Nov. 18, 1988, pp. 1017-1022.
W. Kratschmer, K. Fostiropoulos, D. R. Huffman, "Search For The UV and IR Spectra of $C_{60}$ in Laboratory-Produced Carbon Dust," *Dusty Objects in The Universe*, Sep. 8-13, 1989, pp. 89-93.

(List continued on next page.)

Primary Examiner—Michael L. Lewis
Assistant Examiner—Stephen G. Kalinchak
Attorney, Agent, or Firm—Baker & Botts

[57] ABSTRACT

This invention provides a method of generating fullerenes by vaporizing carbon with the heat from an electrical arc and then condensing a soot from which fullerenes may be recovered.

19 Claims, 2 Drawing Sheets

OTHER PUBLICATIONS

W. Kratschmer, K. Fostiropoulos and D. R. Huffman, "The Infrared and Ultraviolet Absorption Spectra of Labratory-Produced Carbon Dust: Evidence for the Presence of the $C_{60}$ Molecule," Chemical Physics Letters, vol. 170, No. 2, 3, Jul. 6, 1990, pp. 167–170.

Ajie et al., "Characterization of the Soluble All-Carbon Molecules $C_{60}$ and $C_{70}$," The Journal of Physical Chemistry, vol. 94, No. 24, (1990), pp. 8630–8633.

R. E. Haufler, J. Conceicao, L. P. F. Chibante, Y. Chai, N. E. Byrne, S. Flanagan, M. M. Haley, S. C. O'Brien, C. Pan, Z. Xiao, W. E. Billups, M. A. Ciufolini, R. E. Hauge, J. L. Margrave, L. J. Wilson, R. F. Curl, and R. E. Smalley, "Efficient Production of $C_{60}$ (Buckminsterfullerene), $C_{60}H_{36}$ and the Solvated Buckide Ion," The Journal of Physical Chemistry, vol. 94, No. 24, (1990), pp. 8634–8636.

"Buckminsterfullerene Bulletin", Diamond Depositions: Science and Technology, Nov., 1990, pp. 11–13.

R. E. Haufler, Y. Chai, L. P. F. Chibante, J. Conceicao, Changming Jin, Lai-Sheng Wang, Shigeo Maruyama and R. E. Smalley, "Carbon Arc Generation of $C_{60}$," Mat. Res. Soc. Symp. Proc. vol. 260, (1991), pp. 627–637.

Ting Guo, Changming Jin, and R. E. Smalley, "Doping Bucky: Formation and Properties of Boron-Doped Buckminsterfullerene," The Journal of Physical Chemistry, vol. 95, No. 13, (1991), pp. 4948–4950.

Yaw S. Obeng, Allen J. Bard, "Langmuir films of $C_{60}$ at the air-water interface", J. Am. Chem. Soc., vol. 113, No. 16 (1991).

"Move over silicon—it's time for a 'Bucky ball' chip," Chemical Engineering, vol. 98, No. 1, Jan., 1991, p. 17.

Yan Chai, Ting Guo, Changming Jin, Robert E. Haufler, L. P. Felipe Chibante, Jan Fure, Lihong Wang, J. Michael Alford, and Richard E. Smalley, "Fullerenes with Metals Inside," The Journal of Physical Chemistry, vol. 95, No. 20, (1991), pp. 7564–7568.

"Carbon 60," Chemical Business, Mar., 1991, p. 33.

J. Thomas McKinnon, William L. Bell, "Combustion synthesis of buckminsterfullerene," Mar. 17–19, 1991.

Christopher Munford, "New all-carbon hollow molecules under study," American Metal Market, vol. 99, May 1, 1991, p. 4(1).

Rob Lee, "Buckminsterfullerene: The Third Allotrope of Carbon," Chemistry and Industry, May 20, 1991, p. 349(2).

Andrew Moody, "Fullerene chemistry," Chemistry and Industry, May 20, 1991, p. 346(2).

Jim Baggett, "Great Balls of Carbon," New Scientist, Jul. 6, 1991, pp. 34–38.

Tsukasa Furukawa, "Japanese compete in buckyball game: Vacuum Metallurgical enters fray," American Metal Market, Jul. 10, 1991, p. 4.

Tsukasa Furukawa, "New NEC material said to break superconductivity record," American Metal Market, Jul. 24, 1991, p. 4.

"New Molecule Excites the Suberconductivists," Computergram International, Aug. 6, 1991.

Robert F. Curl and Richard E. Smalley, "Fullerenes," Scientific American, Oct., 1991, pp. 54–63.

FIG. 1 <u>60</u>
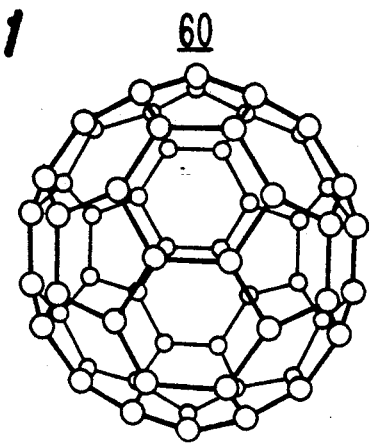
FIG. 2 <u>70</u>
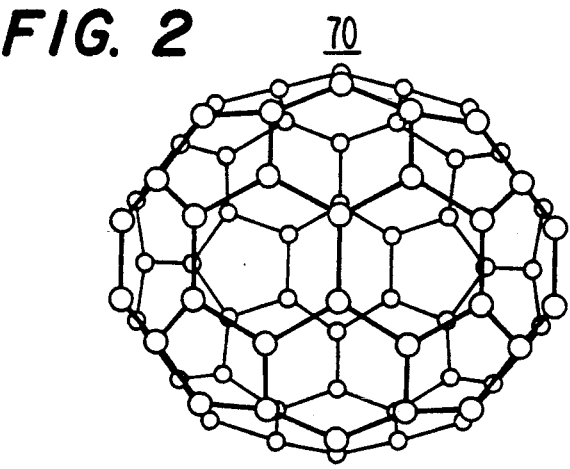
FIG. 3 <u>84</u>
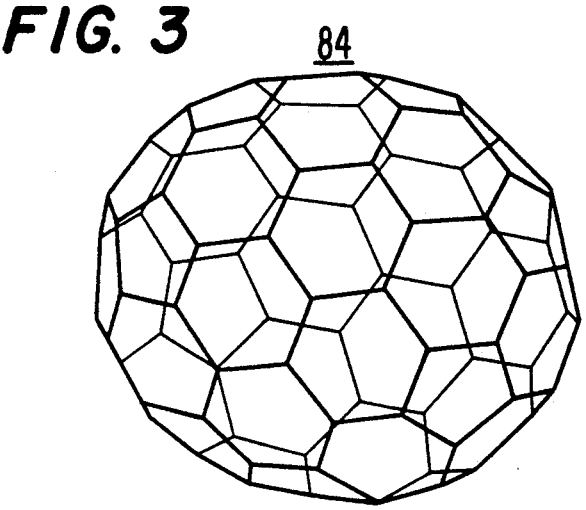

ELECTRIC ARC PROCESS FOR MAKING FULLERENES

BACKGROUND OF THE INVENTION

I. Field of the Invention

This invention was made with Government support and the Government has certain rights in the invention. This invention relates to a process for making a molecular form of carbon known as fullerenes. A fullerene is a third form of pure carbon different from graphite and diamond, the only two forms known before 1985. In 1985, Richard Smalley and a team of chemists at Rice University identified the structure of one fullerene that contained 60 carbon atoms. This $C_{60}$ molecule has come to be known "buckminsterfullerene." See "Fullerenes," Curl, R. F. and Smalley, R. E., Scientific American, Oct., 1991, pp. 54-63, incorporated herein by reference, and references cited therein.

A fullerene structure is characterized in that each carbon atom is bonded to three other carbon atoms. The carbon atoms so joined curve around to form a molecule with a cage-like structure and aromatic properties. A fullerene molecule with 60 carbon atoms resembles the familiar shape of a soccer ball. A structural diagram representing buckminsterfullerene, $C_{60}$, is shown in FIG. 1. Fullerenes may contain even numbers of carbon atoms totalling from 20 to 500 or more. FIG. 2 shows the structure of a $C_{70}$ fullerene and FIG. 3 shows the structure of a $C_{84}$ fullerene. Fullerenes are not necessarily spherical. They may take the form of long tubular structures with hemispherical caps at each end of the tube. Hyperfullerene structures also exist wherein one structure is contained within a second larger structure. For generally spherical molecular structures, these hyperfullerenes resemble an onion layered structure. Tubular structures within larger structures are also possible. Fullerenes are more fully described in the literature cited above.

II. Description of the Prior Art

The molecular structure for buckminsterfullerene was first identified in 1985, see NATURE, $C_{60}$: "Buckminsterfullerene", Kroto, H. W., Heath, J. R., O'Brien, S. C., Curl, R. F. and Smalley, R. E., Vol. 318, No. 6042, pp. 162-163, Nov. 14, 1985. The process described therein for making fullerenes involves vaporizing the carbon from a rotating solid disk of graphite into a high-density helium flow using a focused pulsed laser.

Another method of making fullernes was describe in THE JOURNAL OF PHYSICAL CHEMISTRY, "Characterization of the Soluble All-Carbon Molecules $C_{60}$ and $C_{70}$," AJIE et. al, Vol. 94, No. 24, 1990, pp. 8630-8633. The fullerenes are described as being formed when a carbon rod is evaporated by resistive heating under a partial helium atmosphere. The resistive heating of the carbon rod is said to cause the rod to emit a faint gray-white plume. Soot-like material comprising fullerenes is said to collect on glass shields that surround the carbon rod.

A major drawback to these prior art processes is the extremely low quantity of fullerenes produced. Typical fullerene production rates under the best of circumstances using these processes amount to no more than 100 mg/h. Furthermore, the prior art processes are not easily scaled-up to commercially practical systems. The present invention provides a method for producing fullerenes in much larger quantities than have been possible before. The present invention also provides a method for producing fullerenes which can be scaled up to produce commercial quantities of fullerenes. Other disadvantages of the prior art are also overcome by the present invention which provides a method for producing fullerenes in an electric arc.

SUMMARY OF THE INVENTION

This invention provides a process for making fullerene compounds by heating carbon material using an electrical arc between two electrodes to form a carbon vapor, and then providing space for the carbon atoms in the carbon vapor to combine in a fullerene structure. The fullerene molecules, along with graphite carbon molecules, are then condensed and collected as solid soot material. The fullerenes may be purified by extracting the soot with an appropriate solvent followed by evaporation of the solvent to yield the solid fullerene molecules. These and other features of this invention will become apparent from the following detailed description, wherein reference is made to the figures in the accompanying drawings.

BRIEF DESCRIPTION OF THE DRAWINGS

FIG. 1 is a diagram showing $C_{60}$, buckminsterfullerene.

FIG. 2 is a diagram showing a $C_{70}$ fullerene.

FIG. 3 is a diagram showing a $C_{84}$ fullerene.

DETAILED DESCRIPTION OF THE INVENTION

Figure 4:
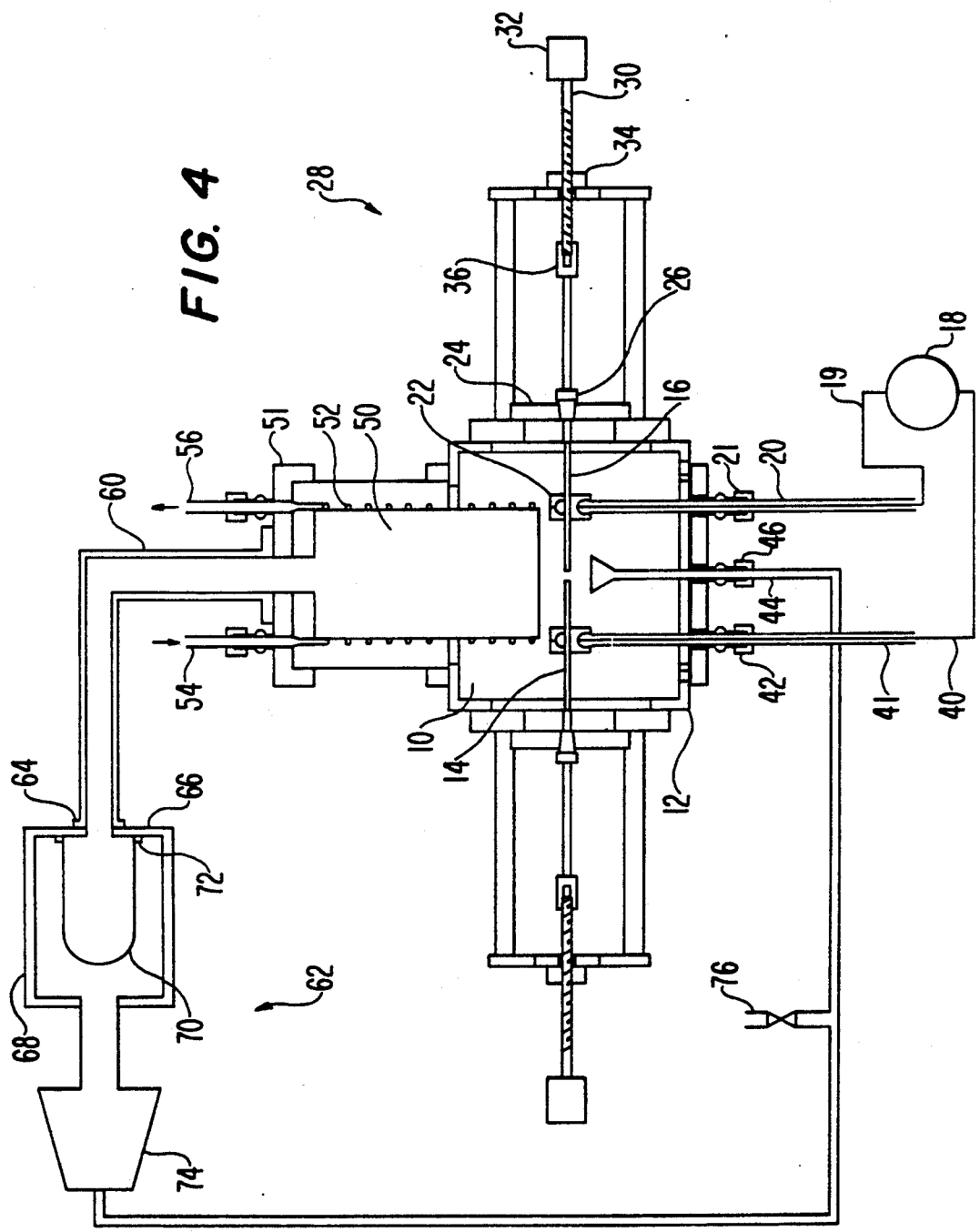
FIG. 4 is a cross-sectional view of a carbon arc fullerene generator.

The invention provides a method for making fullerene molecules in relatively large quantities. Fullerenes are a third allotrope of pure carbon in addition to the previously known forms of diamond and graphite. Fullerenes are formed when a carbon vapor is maintained at conditions that promote growth and formation of fullerene molecules. A carbon vapor may be provided by vaporizing any source of carbon. Diamond, graphite, fullerene or combinations thereof may serve as the carbon source. Graphite is cheaper and is therefore preferred.

The carbon must be heated to a temperature sufficient to form a carbon vapor. In this invention, electrical current arced between two electrodes provides the energy necessary to heat the carbon to a vapor. The inventors have previously described certain aspects of this process in "Efficient Production of $C_{60}$ (Buckminsterfullerene), $C_{60}H_{36}$, and the Solvated Buckide Ion," Haufler et al., The Journal of Physical Chemistry, Vol. 94, No. 24, 1990, pp. 8634-8636 which is fully incorporated herein by reference. Probably, each electrode is formed of carbon and therefore serves as both electrode and carbon source. Other types of materials may be used to form one or both electrodes, such as tungsten, molybedenum, tantalum, or osminum. The electrode material should be electrically conductive and selected to withstand high temperatures on the order of 1000° to 4000° C.

The carbon should be placed in close proximity to the electrical arc between the electrodes. For example, graphite dust could be passed through an electrical arc between two electrodes to form a carbon vapor. Alternately, carbon may be placed close to the arc by constructing one or both electrodes of carbon.

If only one of the electrodes is constructed of carbon, the other electrode should be constructed of the materials described above for non-carbon electrodes. Preferably both electrodes are constructed of carbon and the carbon vapor is formed as the carbon from one or both electrodes erodes at areas in or in close proximity to the electrical arc and vaporizes due to the heat of the arc. Different combinations of carbon sources are contemplated within the scope of the invention. For instance, graphite dust may be blown through an electrical arc between two carbon electrodes or the arc between a carbon and a non-carbon electrode.

The graphite rods suitable for use as electrodes in this invention are graphite rods that conduct electricity. Carbon electrodes, which may be purchased commercially, are completely acceptable. Suitable graphite rods may also be constructed by packing graphite powder together with a graphite cement binder inside a hollow cylinder mold and then compacting the mixture at low to moderate pressure. Compaction pressures of 10 to 110 atom are sufficient. It may be necessary to heat the mixture to a temperature, usually about 150° C. sufficient to melt the binder material. After the material has solidified and cooled, a solid rod, commonly referred to as a green body, may be removed from the mold. This green body is not electrically conductive and therefore is not a suitable electrode. Compounds suitable as binder include pitch type compounds such as C Bond graphite cement produced by Dylon Industries Inc.

The green body should be initially cured at high temperatures in an inert atmosphere. For instance, the green body may be packed in fine sand and heated to a temperature of about 1000° C. in a helium atmosphere for about 24 hours. This process is commonly referred to as carbonization. Thereafter, the temperature should be raised even higher for up to several days. For instance, the rod may be heated to a temperature of 200° to 2500° C. for about 1 week to complete the process of graphitization of the rod. After the rod has been processed in this manner, the rod will conduct electricity, and will be a suitable electrode.

Although cylindrical graphite rods are used as electrodes in the preferred embodiment, the electrodes may be constructed in any shape. For instance, electrodes may be in the shape of rectangular prisms, flat discs or spheres. Many other shapes are possible and within the scope of the invention. The two electrodes need not have the same shape.

An electrical arc may be formed by connecting one of the electrodes to an electrical voltage source and connecting the other electrode to ground. Any method of generating an electrically conductive plasma between the electrodes may be used to start the arcing. An electrical arc between the two electrodes may be started by causing the two electrodes to touch each other, either before or after application of electrical voltage to one of the electrodes, and then separating the two electrodes after electrical current is flowing through the electrodes. While the electrodes remain separated by the gap, the continued application of sufficient electrical voltage to one of the electrodes will maintain the plasma between the electrodes and allow an electrical arc to bridge the arc gap between the two electrodes. During this time, a substantial portion of the electric current is flowing across the arc gap, maintaining the electrically conductive plasma in place.

The amount of voltage necessary to produce an arc will depend on the size and composition of the electrodes, the length of the arc gap, and the ambient gas pressure. The electrical power source may provide either alternating or direct voltage to one electrode. Commercially available arc welding equipment is an acceptable power source. If DC voltage is used, the electric power may be supplied in pulses rather than continuously. Optimum fullerene generation may be obtained by adjusting the frequency and on/off time ratio as required by the particular circumstances such as electrode type, arc gap, atmosphere type and pressure among others. For instance, a 50% duty cycle wherein voltage is supplied only one-half of the time may be optimum. It may also be beneficial to apply the voltage in a series of positive and negative pulses and to alternate those pulses between the two electrodes so that one electrode serves as the positive electrode for a time period and then serves as a ground in rapidly repeating sequence. Although the amount of current necessary may vary depending upon the circumstances, the power requirement generally ranges from 10 to 500 amps at 10 to 50 volts for $\frac{1}{4}$-inch to $\frac{1}{2}$-inch diameter electrodes.

At higher power consumptions, the electrical conductors delivering current to the electrodes may become very hot. In order to maintain the electrical conductors at appropriately low temperatures, it may be necessary to cool the electrical conductors by some means. Cooling may be accomplished by passing a cooling fluid over or through the electrical conductors in order to carry away some of the heat generated. To prevent electrical shorts, the electrical conductor should at all times remain fully electrically insulated from the cooling fluid.

If an electrode is made of carbon, the electrode will erode as the carbon is consumed to form the carbon vapor. To maintain a consistent arc gap between the electrodes, it is therefore necessary to provide some means for maintaining the arc gap within certain limits. A spring connected to one of the electrodes to urge one of the electrodes toward the other with a relatively constant force is one means of providing a relatively constant arc gap. One or both of the electrodes may be fitted with such a spring mechanism. Many other means for maintaining the arc gap within appropriate limit will be readily apparent to those of ordinary mechanical skill, and are within the scope of this invention.

The optimum length of the arc gap between the two electrodes will depend upon the diameter and cross sectional area of the electrodes and other factors such as the operating current, voltage, and ambient conditions of inert gas glow and temperature. Generally, for graphic rods of circular cross section ranging from $\frac{1}{4}$-inch to $\frac{1}{2}$-inch, the arc gap should range between 0.01 mm and 10 mm. Maintaining the arc gap within this range will provide for the maintenance of the electrical arc between the electrodes when electrical voltage is applied to one of the electrodes. Precise control of the gap length is not necessary and the gap length may vary during fullerene generation.

The atmosphere necessary for forming pure carbon fullerene molecules from a carbon vapor includes inert gases such as helium, neon, argon, krypton, and xenon. Other gases may be useful in providing an inert atmosphere as long as the molecules of the atmosphere are not reactive with the carbon vapor. Other possibilities for the atmosphere include carbon monoxide, carbon dioxide and nitrogen. Hydrogen containing gasses such as water vapor should not be used as they are believed detrimental to fullerene formation. Currently, a helium atmosphere is preferred.

The carbon vapor is preferably formed at a low pressure ranging from 1 to 20,000 Torr, and preferably 5 to 2000 Torr. Absolute pressures of helium ranging from 10 to 700, preferably 50 to 500 Torr have been found to be particularly useful for generating a carbon vapor from which fullerenes may be condensed.

Due to the limit atmospheres and pressures within which fullerenes can be collected in sufficient quantities, the process is usually carried out inside a fully enclosed chamber or system. The enclosed chamber or system may be evacuated by means of a vacuum pump thereby removing desirable hydrogen-containing molecules such as water. After the chamber has been evacuated, it may be partially refilled with the desired atmosphere such as helium.

Temperatures within the electrical arc may reach 600° C. or higher. Although a high temperature is necessary to vaporize carbon, the resulting carbon vapor should not reside at this temperature for very long periods. It is therefore desirable to move the carbon vapor from the electrical arc and cool it to allow fullerene molecules to grow within the carbon vapor and to condense solid fullerene molecules along with graphite soot. Condensation of fullerene molecules and graphite soot may be obtained by moving the carbon vapor away from the arc and cooling off the passageway through which it is moving. Temperatures below 300°, preferably below 2000° C. will condense the fullerenes and graphite soot. Cooling and condensation may also be controlled by adjusting the flow velocity and temperature of any inert gas flow of the process more fully described below.

In order to facilitate removal of the carbon vapor from the electrical arc area and passage of the carbon vapor into the condensing area, a gas flow may be provided. The gas may be directed across the electrical arc and into the fullerene condensing area. The gas may then be withdrawn from the condensing area by means of a pump or fan. If inert gas is withdrawn from the system, fresh inert gas should be introduced at about the same rate as gas is withdrawn.

Preferably the gas is recirculated in order to conserve the inert gas. The recirculation may be effected by providing a gas circulating turbine which circulates the inert gas around from the chamber exit back to the chamber gas inlet, across the arc area, through the fullerene condensing zone, and back out the chamber exit. Preferably a filter or other separating means is provided to remove any graphite soot and fullerene molecules that may remain in the gas stream after condensation before the gas stream is reintroduced to the chamber. Any means of separating solid particles from a gas may be utilized, for instance cyclone separators may be used instead of or in addition to filtration. Fullerenes and any graphite soot may also be removed from the gas stream by means of a rotating cooled cylinder or drum located in the gas stream. The cooled rotating cylinder would condense fullerenes on its surface exposed to the carbon vapor stream. Condensed fullerenes could then be scraped or brushed off of the cylinder and recovered.

The process for generating fullerenes may be more fully understood by reference to FIG. 4, which is a cross sectional view of one embodiment a carbon arc fullerene generator. The fullerene generator comprises a vaporization chamber 10 defined by the inside walls of enclosure body 12. The enclosure body 12 may be constructed of any material that is capable of withstanding the temperatures and pressures required. The enclosure body 12 is preferably constructed of stainless steel. Electrode 14 and electrode 16 are placed within the vaporization chamber 10. Electrode 16 is connected to an electrical voltage source 18 via electrical conductor 19 which passes through a water cooled current feedthrough 20. The current feedthrough 20 passes through a wall of enclosure body 12 but is insulated from electrical conductor 19 so that there is no electrical contact between the electrical current source 18 and the enclosure body 12. The opening in enclosure body 12 through which current feedthrough 20 passes is sealed by seal 21 to prevent passage of the outside atmosphere into the vaporization chamber 10.

Electrical conductor 19 provides electrical contact between electrode 16 and electrical current source 18. The radiant energy from the arc required by the fullerene generator will heat electrical conductor 19. In order to reduce power loss and prevent melting of electrical conductor 19, the current feedthrough 20 may be cooled. One method of cooling electrical conductor 19 is to provide a cooling fluid around the electrical conductor 19 by circulating cooling fluid through current feedthrough 20.

Electrical contact between electrode 16 and electrical conductor 19 may be made by any means which will provide electrical conduction between the two. In a preferred embodiment, the electrodes are rotated and the electrical contact between electrical conductor 19 and electrode 16 is made by gimble wheel loaded rod contact 22. The gimble wheel loaded rod contact 22 provides for continuous electrical contact even though the electrode is rotating within the rod contact 22.

In the embodiment shown in FIG. 4, electrode 16 passes through an opening in enclosure body 12 to facilitate rotation of electrode 16. Electrode 16 need not pass through an opening in enclosure body 12 if the electrode is not rotated, or if electrode 16 is rotated by means placed within enclosure body 12. If electrode 16 passes through an opening in enclosure body 12, electrode 16 should be insulated from electrical contact with the enclosure body 12. Insulator 24 provides electrical isolation of the electrode 16 from the enclosure body 12 in the embodiment shown in FIG. 4. Insulator 24 also provides a seal to keep the outside atmosphere from entering vaporization chamber 10 which is usually operated below atmospheric pressure.

Electrode 16 may be rotated by securely attaching a rotation gear 26 concentrically with electrode 16. Rotation gear 26 is connected to a rotational drive mechanism (not shown) that will rotate the gear around its longitudinal axis and thereby rotate electrode 16 along its longitudinal axis. The preferred method of spinning rotation gear 26 is accomplished by passing a continuous drive belt around rotation gear 26 and around a motorized gear which, when rotated, pulls the continuous drive belt around rotation gear 26 thereby spinning rotation gear 26 and electrode 16. Many other methods of rotating the electrode are possible and are within the scope of the invention.

Since the electrodes are consumed during fullerene generation, it is desireable to provide some means for advancing the electrodes toward the gap area in order to maintain the desired gap for the electrical arc. The threaded rod feed mechanism 28 is one means of accomplishing this movement. The feed mechanism 28 comprises a threaded rod 30 fixed to gear 32 at one end.

Threaded rod 30 passes through threaded nut 34 and engages insulator 36. Insulator 36 provides electrical isolation of the electrode 16 from threaded rod 30 and also provides a means for preventing the rotational motion of electrode 16 from being transfered to threaded rod 30. Insulator 36 also serves as a movable platform which fixes the position of electrode 16. Insulator 36 may either be securely fixed to electrode 16 and rotate freely around threaded rod 30 or the insulator 36 may be securely fixed to threaded rod 30 and rotate freely around electrode 16. In either instance, insulator 36, electrode 16, and threaded rod 30 should be cooperatively coupled so that electrode 16 may be pushed or pulled by rotation of threaded rod 30.

Electrode 14 is electrically connected to electrical ground 40 which passes out of vaporization chamber 10 through current feedthrough 41 and is connected to the ground of the electrical voltage source 18. The opening in enclosure body 12 through which current feedthrough 41 passes is sealed by seal 42 to prevent the outside atmosphere from entering into vaporization chamber 10. Since electrical ground 40 will be radiatively heated by the arc, it is preferable to cool electrical ground 40 in the same manner as electrical conductor 19 is cooled. It is also preferable to rotate electrode 14 in the same manner as electrode 16 is rotated. The mechanism for providing the rotation is the same as described for rotating electrode 16. Either or both of the electrodes may be rotated. If both of the electrodes are rotated, it is preferable to rotate each electrode in an opposite direction. This helps maintain an even erosion of the electrode faces. The speed of rotation generally ranges from 1 to 100 rpm.

Provisions should also be made for lateral movement of electrode 14 in the same manner as for electrode 16, i.e., threaded rod feed mechanism 28. Although one lateral adjustment mechanism would be capable of maintaining the proper arc gap, it is preferred to laterally move both electrodes, when both are carbon electrodes, in order to maintain the arc gap in the appropriate location within vaporization chamber 10.

The apparatus described in FIG. 4 further comprises feed conduit 44 which passes through an opening in enclosure body 12. The opening in the wall of enclosure body 12 through which feed conduit 44 passes is sealed by seal 46 to prevent the outside atmosphere from entering into vaporization chamber 10. The outlet end of feed conduit 44 opens within the vaporization chamber 10. The outlet end of feed conduit 44 may be flared or provided with a nozzle to focus the stream which may be flowing through feed conduit 44 and into vaporization chamber 10.

The fullerene generator further comprises a chimney passage 50 passing through a wall of enclosure body 12. The chimney passage 50 extends down through the vaporization chamber 10 to a location near the gap between electrodes 14 and 16. Preferably, the chimney passage is relatively cool. Cooling may be affected by cooling coil 52 which surrounds chimney passage 50. During operation of the fullerene generator, a fluid such as water may be introduced to the cooling coil through cooling coil inlet 54, passed through the cooling coils thus absorbing heat from the chimney passage 50, and then withdrawn through cooling coil outlet 56. The warmed fluid may be disposed of or cooled and recirculated back to the cooling coil inlet 54.

The chimney may be connected through chimney exit 60 to a gas recycle system 62. The chimney exit 60 is sealed to gas recycle system 62 by sealing together flange 64 and flange 66. The gas recycle system 62 comprises a gas collection vessel 68 with a filter bag 70 secured against the inside of flange 66 by seal 72. Filter bag 70 is sealed so that gases and particulates entering the gas recycle system 62 through chimney exit 60 are separated into solid particles which remain inside filter bag 70 and clean gas which passes through the walls of the filter bag into the remaining portion of gas collection vessel 68. The clean gas is then circulated back to feed conduit 44 by means of a gas circulating turbine 74 connected to feed conduit 44. Other methods and means of separating solid particles from gas streams may be utilized as gas recycle system 62 in addition to or in place of filtration. As described above, a cyclone separator or a cooled rotating drum could be utilized as well as other devices known to those skilled in separation techniques.

All passages through the walls of enclosure body 12 should be sealed so that vaporization chamber 10 may be isolated from the atmosphere outside of the fullerene generator. All gas circulation connections should be sealed so that the entire system is free from contamination by the outside atmosphere. Also, the electrodes should be insulated from enclosure body 12 so that electrical current may flow only through electrical conductor 19, electrode 16, the electrical arc between electrode 16 and electrode 14, electrode 14, and electrical ground 40.

Before voltage is applied to the electrodes, the cooling mechanisms should be operating. It may also be necessary to cool enclosure body 12. Electrical conductor 19 and electrical ground 40 should both be cooled by circulating water around the current carrying devices. The cooling of chimney passage 50 should also begin before the current is applied. In normal operation, electrodes 14 and 16 are both electrically conductive graphite rods. If electrodes 14 and 16 are in the shape 450 of long right cylinders (rods) they should be aligned on the same longitudinal axis.

The vaporization chamber 10 should also be free of water. Preferably the vaporization chamber is evacuated to a pressure of less than $10^{-2}$ Torr. After the vaporization chamber 10 has been evacuated, a small amount of inert gas may be added through gas addition inlet 76 and circulated via the gas circulating turbine 74. To start the device, electrodes 14 and 16 should be adjusted to barely touch. At this time, with the electrodes touching, the electrical voltage source 18 should be activated to apply voltage to electrode 16 in an amount sufficient to cause an electrical current to flow from electrode 16 to electrode 14. After current flows, the electrodes should be separated to achieve the desired arc gap. In practice, the gap may be very short and the electrodes may appear to touch and the arc may be described as a "contact arc". The position of each electrode should be adjusted, as the electrodes erode, to maintain the desired gap between them so that the arc will continue. Electrode 16 may be moved by turning threaded rod 30 by turning gear 32 in order to push electrode 16 toward electrode 14. Electrode 14 may be pushed toward electrode 16 in the same manner by rotating the threaded rod connected to electrode 14.

Feed conduit 44 is positioned so that the inert gas exits feed conduit 44 and passes around and through the arc gap area. If graphite dust is to be passed through the arc, the graphite dust may be mixed with the inert gas and introduced to the system through gas addition inlet 76. If the temperature of the inert gas is to be adjusted, this this may be accomplished by either heating or cooling feed conduit 44 by known heating or cooling means.

Carbon vapor flows to chimney passage 50 where the temperature is low enough to condense a carbon soot on the walls of chimney passage 50. This carbon soot comprises two different forms of pure carbon, graphite and fullerene molecules. Soot particles remaining in the vapor but not condensed on the walls of the chimney passage 50 pass through chimney exit 60 and are separated from the gas stream by filter bag 70. The cleaned inert gas is then recirculated by gas circulating turbine 74 back to feed conduit 44 where it is reintroduced to the carbon evaporization zone. Any inert gas makeup that is necessary may be introduced through gas addition inlet 76.

The process may be continued until the electrodes have been consumed, at which time the electrical voltage should be withdrawn. Carbon soot lining the walls of the chimney passage 50 and filter bag 70 may then be recovered. Recovery of fullerene compounds from the carbon soot may be accomplished by extracting the carbon soot with an extraction solvent which preferentially dissolves fullerene compounds but not graphite. The extract may then be filtered to remove the solid graphite leaving a filtrate containing the solvent and fullerenes. Evaporation of the solvent from the extract will allow recovery of fullerenes as the solid residue. Separation of fullerene from graphite may be accomplished by other methods known to those skilled in separation arts. For instance, separation may be accomplished by boiling solvents, ultrasonic sonification separation, supercritical fluid extraction, Soxhlet extraction and many other methods known to those skilled in separation arts.

Although the embodiment described utilizes a circulating gas stream, gas recirculation is not required. When gas circulation is not used, carbon vapor from the electrical arc passes into the condensing zone by convection currents. Operation of the process in this manner may be accomplished by sealing off chimney passage 50 at chimney cap 51. Carbon soot will condense on the cool chimney walls until the voltage is withdrawn or the carbon source is completely vaporized. After carbon condensation stops, carbon soot may be recovered by opening the system, for instance by removing chimney cap 51, and gently scraping or brushing the carbon soot from the chimney walls. Fullerenes may then be recovered from the soot as described above.

Although not required by the invention, it may be beneficial to provide a separate zone where the growth and formation of fullerenes are promoted. This zone is referred to as a fullerene annealing zone and provides an atmosphere where the temperature, pressure and residence time favor the growth and formation of fullerenes. Temperatures within the fullerene annealing zone preferably range between 1,000° and 2,000° C. Although the optimum residence time within the fullerene annealing zone is not known with certainty, residence times between 1 millisecond to 1 second are usually sufficient to allow the growth and formation of fullerene molecules. The desired pressure ranges and atmosphere types are the same as described for carbon vapor formation. The fullerene molecules are then removed from the fullerene annealing zone along with graphite soot and condensed in an area of lower temperature.

With reference to the drawing in FIG. 4, the carbon vapors formed by the electrical arc between the electrodes are carried away by the inert gas into a fullerene annealing zone above the electrical arc but below the chimney passage 50. In this area, the temperature is appropriate for the growth and formation of fullerenes from the carbon vapor. This fullerene annealing zone may be comparatively small and vapor passage through it relatively rapid. Fullerene growth and formation may or may not be completed in the fullerene annealing zone. Substantial fullerene growth and formation may occur in the carbon vapor generation zone as well as the fullerene condensing zone.

EXAMPLE 1

Fullerenes were generated and recovered in this example by utilizing an apparatus similar to the one describe din FIG. 4, but without utilizing a gas recycle system 62. Instead, chimney passage 50 was closed at chimney cap 51. Two graphite electrodes, each having an outside diameter of 6 mm, were mounted within the apparatus along the same latitudinal axis in the relationship depicted in FIG. 4 and described above. Both electrodes were 25 mm below the bottom of the chimney passage. The generator was sealed and evacuated to a pressure of 0.035 Torr, and then pressurized to 125 Torr with high purity helium gas.

The chimney passage and current feedthroughs were cooled by circulating water, and the arc gap between the electrodes was initially 10 mm when a 60 hertz alternating current type voltage was applied to one electrode. The electrode faces were then brought into contact with each other to start the arcing process. The arc was established immediately on contact and the electrodes were pulled apart leaving an arc gap of 3 mm which was sustained during the remainder of the run. The electrical current measured about 150 amps at 26 volts. After the run started, the pressure increased to 140 Torr probably because of the increase in temperature in the vaporization chamber due to the radiative energy from the arc.

The run was continued for 16 minutes and consumed 10 cm of each electrode, corresponding to 8 grams of carbon. After the run was stopped, soot was collected from the inside of the chimney walls. The soot was extracted with toluene and filtered to remove graphite. Subsequent qualitative ultraviolet/visible absorption spectroscopy confirmed the presence of fullerenes. Quantitative analysis determined that the soot contained 13% by weight fullerenes.

EXAMPLE 2

Using the same procedures outlined in Example 1, fullerene yields were measured under different gas atmospheres and pressures. The results are set forth in Table 1 below.

TABLE 1

| | Fullerene Yields (Wt. % of Soot) | | | | |
|---|---|---|---|---|---|
| Pressure (Torr) | 10 | 25 | 100 | 250 | 760 |
| Nitrogen | 0.1 | 0.2 | 0.8 | 0.25 | 0.20 |
| Argon | 2.0 | 5.2 | 4.8 | 3.8 | 2.0 |
| Helium | 0.15 | 1.5 | 13.0 | 7.5 | 4.5 |

It is apparent from these results that fullerenes may be produced by this method at a rate of 5 g/hr or more.

The description and examples above illustrate aspects of the invention and are not limitations on the scope of the invention which is set forth in the following claims. Many other variations and modifications may be made to the process described without departing from the concept of the present invention.

That which is claimed is:

1. A process for making fullerenes comprising:
   (a) providing a carbon vapor generation zone which comprises a first electrode and a second electrode,
   (b) maintaining the carbon vapor generation zone in an atmosphere consisting essentially of an atmosphere selected to form fullerene molecules,
   (c) applying sufficient electrical voltage to the first electrode to maintain an electrical arc between the first electrode and the second electrode,
   (d) providing a carbon source in close proximity to the electrical arc, so that the carbon source is heated by the electrical arc to form a carbon vapor,
   (e) passing the carbon vapor to a fullerene condensing zone where the carbon vapor is condensed into a solid carbon soot, and
   (f) recovering fullerenes from the carbon soot.

2. A process in accordance with claim 1 wherein either the first electrode or the second electrode comprises carbon.

3. A process in accordance with claim 1 wherein the first electrode and the second electrode are both comprised of carbon.

4. A process in accordance with claim 3 wherein the carbon vapor generation zone and the fullerene condensing zone are maintained in an atmosphere consisting essentially of an inert gas at a pressure of 5 to 2000 Torr.

5. A process in accordance with claim 4 wherein the inert gas is helium and the pressure of the inert gas ranges from 50 to 500 Torr.

6. A process in accordance with claim 5 wherein the carbon vapor is passed through a fullerene growth and annealing zone maintained at a temperature of 1000 to 2000° C. before being passed to the fullerene condensing zone.

7. A process in accordance with claim 6 wherein the electrical power supplied to the first electrode ranges from 10 to 500 amps at 10 to 50 volts rms.

8. A process in accordance with claim 7 wherein the first electrode and the second electrode are maintained apart, to produce an arc gap of between 0.01 and 10 mm.

9. A process in accordance with claim 4 wherein the inert gas passes through the carbon vapor generation zone, through the fullerene condensing zone, is withdrawn from the fullerene condensing zone and recirculated back to the carbon vapor generation zone.

10. A process in accordance with claim 1 wherein providing a carbon source in close proximity to the electrical arc is accomplished by passing graphite dust around or through the electrical arc.

11. A process in accordance with claim 10 wherein the graphite dust is carried to the electrical arc by an inert gas.

12. A process in accordance with claim 11 wherein the inert gas is helium, and the carbon vapor generation zone and fullerene condensing zone are maintained in an atmosphere consisting essentially of helium at a pressure of 10 to 700 Torr.

13. A process in accordance with claim 12 further comprising a fullerene growth and annealing zone maintained at a temperature of 1000° to 2000° C., wherein the carbon vapor is passed through the fullerene growth and annealing zone and thereafter to the fullerene condensing zone.

14. A process in accordance with claim 11 wherein the inert gas passes through the carbon vapor generation zone, through a fullerene growth and annealing zone, through the fullerene condensing zone, is withdrawn from the fullerene condensing zone and recirculated back to the carbon vapor generation zone.

15. A process in accordance with claim 14 wherein carbon soot is separated from the inert gas before the inert gas is recalculated back to the carbon vapor generation zone.

16. A process for making fullerenes comprising vaporizing carbon with a plasma in an atmosphere consisting essentially of an atmosphere that promotes fullerene growth and formation thereby forming fullerenes and recovering said fullerenes.

17. A process in accordance with claim 16 where in the plasma is maintained as an electrical arc between two electrodes.

18. A process in accordance with claim 17 wherein an inert gas circulates and carries vaporized carbon away from the plasma into a zone where fullerene growth and formation occurs.

19. A process in accordance with claim 18 wherein the inert gas is moved from the zone where fullerene growth and formation occurs and is recirculated back to the plasma.

* * * * *